(12) United States Patent
Mullins et al.

(10) Patent No.: US 10,078,839 B1
(45) Date of Patent: Sep. 18, 2018

(54) CENTRALIZED SYSTEM FOR DATA RETRIEVAL

(71) Applicant: Square, Inc., San Francisco, CA (US)

(72) Inventors: Brian Mullins, San Francisco, CA (US); Fredrick Lee, San Francisco, CA (US); Timothy Yip, Point Richmond, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/691,301

(22) Filed: Aug. 30, 2017

(51) Int. Cl.
*G06Q 20/00* (2012.01)
*G06Q 40/00* (2012.01)
*G06Q 20/40* (2012.01)
*G06Q 20/20* (2012.01)
*G06Q 20/02* (2012.01)
*G06F 17/30* (2006.01)

(52) U.S. Cl.
CPC ... *G06Q 20/4016* (2013.01); *G06F 17/30979* (2013.01); *G06Q 20/02* (2013.01); *G06Q 20/204* (2013.01)

(58) Field of Classification Search
USPC .......................................................... 705/17
See application file for complete search history.

(56) References Cited

U.S. PATENT DOCUMENTS

| | | | |
|---|---|---|---|
| 5,412,806 A | 5/1995 | Du et al. | |
| 5,732,400 A * | 3/1998 | Mandler | G06Q 20/02 705/26.44 |
| 6,029,154 A * | 2/2000 | Pettitt | G06Q 20/027 705/38 |
| 7,624,068 B1 * | 11/2009 | Heasley | G06Q 20/10 705/38 |
| 8,290,838 B1 * | 10/2012 | Thakur | G06Q 40/02 705/35 |
| 2002/0099649 A1 * | 7/2002 | Lee | G06Q 20/04 705/38 |
| 2002/0194119 A1 * | 12/2002 | Wright | G06Q 20/04 705/38 |
| 2003/0069820 A1 * | 4/2003 | Hillmer | G06Q 20/206 705/35 |
| 2007/0138259 A1 * | 6/2007 | Dragt | G06Q 20/04 235/380 |

(Continued)

*Primary Examiner* — Ashford S Hayles
(74) *Attorney, Agent, or Firm* — Lee & Hayes, PLLC

(57) ABSTRACT

This disclosure describes, in part, techniques for storing transaction data at a central service, and techniques for querying information associated with the data from the central service when authorizing payment instruments for transactions. For instance, a central service may receive historical transaction data from multiple payment services that authorize payment instruments for merchants, and then store the historical transaction data in one or more databases. A payment service may then receive a request to authorize a payment instrument for a transaction between a merchant and a customer. Based on receiving the request, the payment service can send the central service a message that includes a query for information associated with historical transaction data corresponding to the payment instrument. In response, the payment service can receive the information from the central service and authorize the payment instrument using the information.

19 Claims, 8 Drawing Sheets

(56) References Cited

U.S. PATENT DOCUMENTS

| | | | |
|---|---|---|---|
| 2007/0162387 A1* | 7/2007 | Cataline | G06Q 20/10 705/40 |
| 2007/0192249 A1* | 8/2007 | Biffle | G06Q 10/02 705/44 |
| 2008/0120218 A1* | 5/2008 | Reid | G06Q 20/10 705/37 |
| 2009/0089869 A1* | 4/2009 | Varghese | G06F 21/31 726/7 |
| 2009/0119176 A1* | 5/2009 | Johnson | G06Q 20/04 705/14.27 |
| 2009/0125448 A1* | 5/2009 | Borkovec | G06Q 10/04 705/36 R |
| 2010/0043055 A1* | 2/2010 | Baumgart | G06Q 20/12 726/2 |
| 2010/0274719 A1* | 10/2010 | Fordyce, III | G06Q 20/22 705/44 |
| 2011/0016052 A1* | 1/2011 | Scragg | G06Q 20/02 705/44 |
| 2012/0278193 A1* | 11/2012 | Groat | G06Q 20/20 705/26.1 |
| 2012/0290382 A1* | 11/2012 | Martin | G06Q 20/10 705/14.34 |
| 2013/0138563 A1* | 5/2013 | Gilder | G06Q 20/4016 705/44 |
| 2013/0218765 A1* | 8/2013 | Hammad | G06Q 20/4016 705/41 |
| 2014/0108166 A1* | 4/2014 | Murphy | G06Q 30/06 705/16 |
| 2014/0129423 A1* | 5/2014 | Murphy | G06Q 20/10 705/39 |
| 2014/0129424 A1* | 5/2014 | Murphy | G06Q 20/14 705/39 |
| 2014/0129443 A1* | 5/2014 | Whitler | G06Q 20/38 705/44 |
| 2015/0012430 A1* | 1/2015 | Chisholm | G06Q 20/4016 705/44 |
| 2015/0134512 A1* | 5/2015 | Mueller | G06Q 20/4016 705/39 |
| 2015/0235220 A1* | 8/2015 | Murphy, Jr. | G06Q 20/4016 705/75 |
| 2017/0140385 A1* | 5/2017 | Dobson | G06Q 20/4016 |

* cited by examiner

US 10,078,839 B1

CENTRALIZED SYSTEM FOR DATA RETRIEVAL

BACKGROUND

Merchants may conduct transactions for items and services with customers. To conduct a transaction with a customer, a merchant can use a point-of-sale (POS) device to receive payment from the customer, such as in the form of a payment instrument. The merchant can then use the POS device to authorize the payment instrument for a cost of the transaction. For instance, the POS device can send a request to a payment service to authorize the payment instrument for the cost of the transaction. In response, the POS device can receive a message indicating whether the payment instrument is authorized for the transaction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
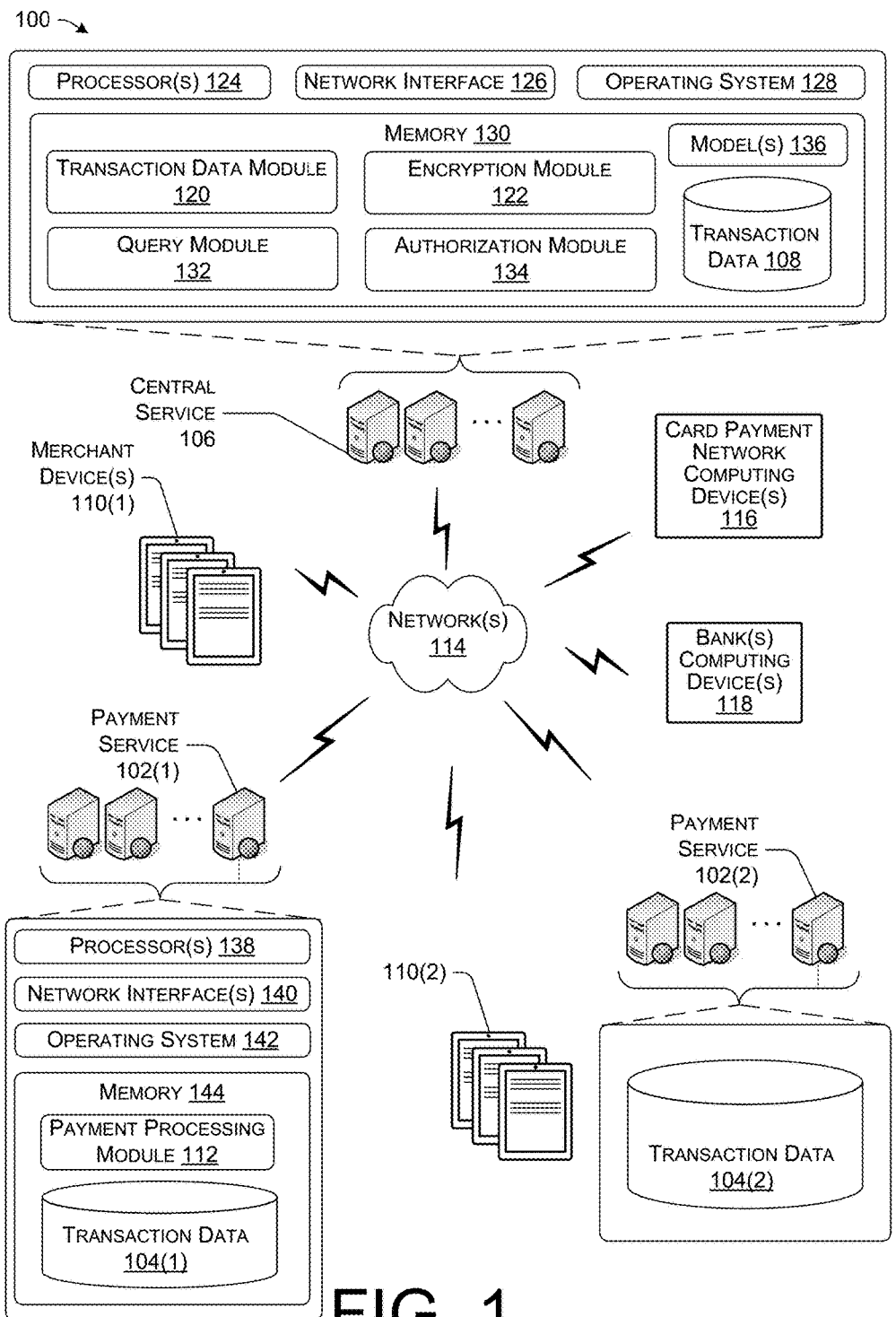
FIG. 1 illustrates an example environment that includes payment services sending data to a central service. The central service then stores the data in one or more databases.

This disclosure describes, in part, techniques for storing data at a central service, and techniques for querying the data from the central service when authorizing payment instruments for transactions. For instance, a payment service (also referred to as a "first payment service") may receive transaction data from point-of-sale (POS) devices associated with merchants. The transaction data for each transaction can indicate an identifier of a customer, payment information associated with a payment instrument used during the respective transaction (e.g., card data), item(s) acquired by the customer, a cost of the item(s) acquired by the customer, a time of the respective transaction, a place (e.g., geographical location) of the respective transaction, a date of the respective transaction, and so forth. The payment service can then attempt to authorize the respective payment instrument for each transaction using the received transaction data.

For instance, the payment service may utilize stored transaction data (also referred to as historical transaction data or historical transaction information) and one or more models to authorize payment instruments for transactions. The historical transaction data can include data associated with previous transactions that the payment service has attempted to authorize for the merchants. For instance, the historical transaction data associated with a payment instrument can indicate a number of times that the payment service has attempted authorize the payment instrument, a frequency of transactions in which the payment instrument is utilized, costs of transactions in which the payment instrument was utilized, a time, place (e.g., geographical location), and date of the transactions in which the payment instruments was utilized, whether each transaction was authorized or not authorized, one or more identities of customers that have utilized the payment instrument, whether the payment instrument has been utilized fraudulently during a transaction, and/or the like.

A model can include one or more rules that analyze the historical transaction data and/or received transaction data to determine a score (e.g., a risk score) associated with authorizing a payment instrument. For example, a model may include a first rule that compares the cost of the current transaction being authorized to costs of previous transactions in which the payment instrument was utilized to determine whether the cost of the current transaction falls within a range. For a second example, a model can include a second rule that compares the geographic location in which the current transaction is being conducted to geographical locations of previous transactions in which the payment instrument was utilized to determine whether the geographical location is within a geographic region (e.g., within a similar city, state, country, etc.).

For a third example, a model can include a third rule that compares a frequency in which the payment instrument is currently being utilized to a frequency in which the payment instrument was utilized in previously transactions to determine whether there is a discrepancy in the frequency (e.g., the payment instrument is being utilized at an unusually high frequency). For a fourth example, and for a transaction that occurs at an online marketplace, a model can include a fourth rule that compares a shipping address associated with a transaction to shipping addresses of previously transactions in which the payment instrument was utilized. In some instances, a model can include one or more of the rules above.

After determining the score using the one or more models, the payment service can compare the score to a threshold score (also referred to as a threshold risk score or a threshold risk value) to determine whether to authorize the payment instrument. For instance, the payment service can authorize the payment instrument for the transaction based on the score not traversing (e.g., not exceeding, being below or equal to, etc.) the threshold score. Alternatively, the payment service may not authorize the payment instrument for the transaction based on the score traversing (e.g., exceeding, being greater than) the threshold score. In some instances, a score range can include 0-100 when attempting to authorize payment instruments, and the threshold score can include any number between 0 and 100. Additionally, or alternatively, in some instances, the score range can include any range (e.g., 0-10, 0-1000, etc.), and the threshold score can include any number that falls within the range.

In some instances, there may be multiple payment services that perform similar authorization techniques as the payment service described above. For instance, the payment service may include a first payment service that authorizes transactions for a first set of merchants. Additionally, there may be a second payment service that authorizes transactions for a second set of merchants, a third payment service that authorizes payment instruments for a third set of merchants, and so on. As such, it may be advantageous for each of the payment services to securely share respective historical transaction data (and/or information describing the respective historical data) that the respective payment services utilize to authorize payment instruments.

For instance, as discussed above, the first payment service stores first historical transaction data of previous transactions between the first set of merchants and customers, and then uses the first historical transaction data to determine whether to authorizes a payment instrument for a transaction. Additionally, a second payment service may store second historical transaction data of previous transactions between the second set of merchants and customers, and then use the second historical transaction data to determine whether to authorize a payment instrument for a transaction.

In some instances, a customer may utilize a payment instrument during a first transaction at a merchant that is included in the second set of merchants, which is authorized by the second payment service, and then later utilize the payment instrument during a second transaction at a merchant that is included in the first set of merchant, which the first payment service authorizes. However, since the second payment service stores the historical transaction data for the first transaction locally, such that the first payment service does not have access to the historical transaction data, the first payment service cannot utilize the historical transaction data (and/or data information associated with the historical transaction data) associated with the first transaction when determining whether to authorize the payment instrument for the second transaction.

As such, it may be advantageous to the first payment service to utilize the historical transaction data associated with the first transaction when authorizing the payment instrument for the second transaction. For instance, by including the historical transaction data for the first transaction in the score calculated by the model, the model is capable of calculating a more accurate score since the calculation is based on additional historical transaction data associated with the payment instrument. Therefore, techniques described herein provide a central service (also referred to as a central data store) that each payment service can send respective historical transaction data to for storage. Each payment service can then send a query to the central service for historical transaction data and/or information associated with the historical transaction data when authorizing a payment instrument for a respective transaction.

For instance, the central service may communicate via a network with the payment services to receive historical transaction data that is stored locally by each payment service. The central service can then store the historical transaction data in one or more databases. In some instances, the central service stores the historical transaction data using one or more encryption techniques, such that the payment services cannot access the historical transaction data (e.g., the raw historical data). For instance, in some examples, the central service can store the historical transaction data using blockchain or other distributed ledger storage techniques. In such examples, the payment services can query the central service for information describing the historical transaction data using hash values or other encryption techniques, and then receive the information without receiving the raw historical transaction data.

For instance, to authorize a payment instrument for a transaction between a merchant and a customer, a payment service can send a query for historical transaction data associated with the payment instrument to the central service. In response, the central service can analyze the stored historical transaction data to identify at least a portion of the historical transaction data that is associated with the payment instrument. In some instances, the central service can then send the portion of the historical transaction data back to the payment service. Additionally, or alternatively, in some instances, the central service can generate information describing the portion of the historical transactions data, where the information corresponds to the query. The central service can then send the information to the payment service.

For instance, a merchant may conduct a transaction with a customer. During the transaction, a POS device associated with the merchant may receive input, such as payment information associated with a payment instrument, item(s) being acquired by the customer, cost(s) of the item(s) being acquired by the customer, a total cost of the transaction, or the like. The POS device can then send the payment service a request to authorize the payment instrument for the cost of the transaction. The request can include at least the payment information, item(s) being acquired by the customer, the cost(s) of the item(s), the total cost of the transaction, a time, place (e.g., geographical location), and date of the transaction, and/or the like.

The payment service can then attempt to authorize the payment instrument for the cost of the transaction. For instance, the payment service can send the central service a message that includes an indication of the payment information and a query for information associated with the payment instrument. In some instances, the query can request a type of data and/or information associated with a type of data, where the type of data can include costs of previous transactions in which the payment instrument was utilized, geographical locations of the previous transactions in which the payment instrument was utilized, times of the previous transactions in which the payment instrument was utilized, a frequency of the previous transactions in which the payment instrument was utilized, and/or the like. The central service can receive the message from the payment service and, in response, analyze the historical transactions data (from all of the payment services) to identify historical transaction data that is associated with the payment instrument. In some instances, the central service can then utilize identified historical transaction data to generate the information for the payment service.

For instance, the central service can identify a first portion of the historical transaction data that is associated with transactions in which the payment instrument was utilized. If the query indicates a specific type of data, the central service can then analyze the first portion of the historical transaction data to identify a second portion of the historical transaction data that is associated with the type of data. In some instances, the central service can then send the requested data back to the payment service, where the requested data either includes the first portion of the historical transaction data or the second portion of the historical transaction data. Additionally, if the historical transaction data associated with the payment instrument indicates any fraudulent transactions that included the payment instrument, the central service can further send the payment service data indicating the fraudulent transactions.

Additionally, or alternatively, in some instances, the central service can use the first portion of the historical transaction data and/or the second portion of the historical transaction data to generate information corresponding to the query. For instance, if the query requests information about geographical locations (e.g., states) in which the payment instrument has previously been utilized, the central service can utilize the second portion of the historical transaction data (e.g., which may indicate the geographical locations) to generate information describing the geographical locations. For instance, the information may indicate that the payment information has been utilized in the states of Washington, Oregon, and Montana. The central service can then send data representing the generated information back to the payment service without sending the raw historical transaction data that was used to generate the information.

The payment service can receive the data (e.g., the historical transaction data and/or the data describing the generated information) from the central service and, in response, use the data to authorize the payment instrument for the transaction. For instance, the payment service can utilize one or more models (described above) and the data received from the central service to analyze the current transaction in which the payment instrument is being utilized to satisfy the cost of the transaction. Based on the analysis, the payment service can determine a score for the transaction. The payment service can then determine whether the score traverses (e.g., exceeds) the threshold score. Based on determining that the score does not traverse (e.g., does not exceed) the threshold score, the payment service can send the POS device a message indicating that the payment instrument is authorized for the cost of the transaction. However, based on determining that the score traverses the threshold score, the payment service can send the POS device a message indicating that the payment instrument is not authorized for the cost of the transaction.

In some instances, the payment service can further send the central service transaction data associated with the current transaction. For instance, the payment service can send the central service transaction data that includes an identifier of the customer, the payment information associated with the payment instrument used during the transaction, the item(s) acquired by the customer, the cost of the item(s) acquired by the customer, the time, place, and date of the transaction, and so forth. In response, the central service can store the transaction data associated with the transaction with the historical transaction data in the one or more databases.

It should be noted that, in some instances, the payment service may first attempt to authorize the payment instrument for the cost of the transaction using the one or more models and any historical transaction data that is stored by the payment service. In such instances, the payment service may then send the message to the central service querying the additional historical transaction data and/or the information describing the historical transaction data based on the initial attempt determining that the payment instrument is not authorized for the transaction, is authorized for the transaction, and/or both.

For instance, the payment service may first analyze the current transaction using a first model and historical transaction data associated with the payment instrument that is stored locally by the payment service. Based on the first analysis, the payment service may determine that a first score for authorizing the transaction traverses a first threshold score. In response, the payment service may send the message to the central service for the additional historical transaction data and/or the information describing the historical transaction data. The payment service may then analyze the current transaction using at least one of the first model or a second model and the data received from the central service (e.g., the queried historical transaction data and/or the information describing the historical transaction data). Based on the second analysis, the payment service may authorize the payment instrument for the current transaction.

In some instances, to authorize the current transaction based on the second analysis, the payment service may determine a second score using the second analysis. The payment service may then authorize the transaction based on the second score not traversing the first threshold score and/or a second threshold score. Additionally, or alternatively, in some instances, the payment service may first determine a final score that is based on the first score and the second score. For example, the payment service may take the average of the first score and the second score to determine the final score. For a second example, the payment service may adjust the first score based on the second score to determine the final score. For a third example, the payment service may weigh the first score and/or the second score to determine the final score. The payment service may then authorize the transaction based on the final score not traversing the first threshold score and/or a second threshold score.

Additionally, in some instances, the central service may include one or models that analyze the transaction data of the current transaction in order to determine whether to authorize the payment instrument for the cost of the transaction between the merchant and the customer (using similar techniques as described above with regard to the payment service). In such instances, the central service can send the payment service at least one of an indication of whether the payment instrument was authorized for the cost of the transaction, a score calculated by the central service, the data associated with the payment instrument that is queried by the payment service, and/or the like.

By having a central service that collects and stores historical transaction data from each of the payment services, and then uses the historical transaction data to send data to a payment service when such data is queried, the techniques described above provide improvements over conventional services that authorize payment instruments and/or perform risk analysis for merchants (in order to supplement authorization performed by issuing banks/networks). For instance, a payment service is capable of receiving and utilizing historical transaction data from multiple payment services to determine whether to authorize a payment instrument, instead of just locally stored historical transaction data. As such, the authorization process is capable of providing more accurate scores and results, as the analysis is based on additional historical transaction data. By providing more accurate scores and results, the authorization processes can reduce fraudulent transactions, thus reducing chargebacks, which can consume computing resources.

Additionally, by having a central service that collects and stores historical transaction data from each of the payment services, each payment service is not required to store local historical transaction data thus, saving memory. Furthermore, in some instances, since the central service encrypts the historical transaction data, payment services that query the central service may only be able to obtain information about the historical transaction data and not the raw historical transaction data. As such, a first payment service can prevent transaction data associated with a first merchant, which may include sensitive information that the first merchant wants to keep secret, from being obtained by a second payment service and/or second merchant. However, the second payment service can still use information associated with the transaction data, which is received from the central service, to perform the risk analysis.

Moreover, each payment service can generate and utilize a model that is based on the authorization preferences of the respective payment service. For instance, as discussed above, a payment service can use a model that includes one or more rules for determining a score for authorizing a payment instrument. As such, the payment service can send a message to the central service that includes a query for a specific type of data and/or information, which can be based on which rules the model is using to calculate the score.

For example, if a first payment service utilizes a first model that calculates a score based on the cost of the transaction in which the payment instrument is being authorized, rather than the geographic location, the first payment service can send the central service a message that queries for information indicating costs of previously transactions in which the payment instrument was utilized. Additionally, if a second payment service utilizes a second model that calculates a score based on the geographic location of the transaction in which the payment instrument is being authorized, rather than the cost, the second payment service can send the central service a message that queries for information indicating geographic locations of previously transactions in which the payment instrument was utilized.

As described herein, messages can include any type of electronic communication that electronic devices can send and receive with other electronic devices. For instance, a message can include an email message, a short message service (SMS), multimedia messages (MMS), a voicemail message, audio data, video data, or any other type of electronic communication that an electronic device can send to another electronic device. In some instances, an electronic device may use messages to send indications, notifications, alerts, queries, and/or requests to another electronic device. Additionally, in some instances, an electronic device may use messages to instruct (i.e., cause) another electronic device to perform a function.

It should be noted that, while the examples described herein include authorizing a transaction based on a score not traversing a threshold score and not authorizing the transaction based on the score traversing a threshold score, in some instances, a payment service and/or the central service may authorize a transaction based on the score traversing a threshold score and not authorize the transaction based on the score not traversing the threshold score. In such instances, a higher score may indicate that authorizing a payment instrument for the transaction includes a lower risk.

Additionally, in some instances, a payment service and/or the central service may authorize a transaction based on the score being below a threshold score and not authorize the transaction based on the score being equal to or traversing the threshold score. Furthermore, in some instances, a payment service and/or the central service may authorize a transaction based on the score being equal to or traversing a threshold score and not authorize the transaction based on the score being below the threshold score.

In some instances, a score traverses a threshold score by the score exceeding (e.g., being greater than) the threshold score. In some instances, a score does not traverse a threshold score by the score not exceeding (e.g., being equal to or less than) the threshold score.

It should be noted that, while the techniques and examples herein describe attempting to authorize a payment instrument during a transaction, similar techniques may be utilized for other authorization purposes. For instance, similar techniques can be utilized to authorize payment transfers, authorizing data sharing, authorizing account credentials, identifying spam email, and/or the like.

For example, with regard to authorizing account credentials, the central service may store historical data indicating geographical locations of electronic devices that have accessed a given account using specific credentials. As such, when a customer attempts to utilize the specific credentials to log into the account to purchase items, a payment service and/or other third-party system may query the central service to retrieve information indicating the geographical locations. The payment service and/or other third-party system can then compare the geographic location of the customer (e.g., the geographical location of the electronic device that the customer is using) to the received information to determine a risk score. The payment service and/or other third-party system can then use the risk score to determine whether to authorize the customer to login to the account.

FIG. 1 illustrates an example environment 100 that includes payment services 102(1)-(1) respectively sending transaction data 104(1)-(2) (e.g., referred to as historical transaction activity or historical transaction data) to a central service 106 (also referred to as a central data store). In response, the central service 106 then stores the transaction data 104(1)-(2) in one or more databases, as represented by transaction data 108. The transaction data 104(1)-(2) for a previous transaction can include an identifier of a customer, payment information associated with a payment instrument used during the transaction, item(s) acquired by the customer, a cost of the item(s) acquired by the customer, a time, place (e.g., geographical location), and date of the respective transaction, and so forth.

For instance, a first payment service 102(1) may authorize transactions for first merchants associated with first merchant device(s) 110(1). To authorize a respective transaction, the payment processing module 112 may function to receive, via a network 114, information regarding the respective transaction from a first merchant device 110(1). The information can include payment information of a payment instrument (e.g., card data), a cost of the transaction, item(s) acquired by the customer, a time, place and date of the transaction, a card network associated with the payment instrument, an issuing bank of the payment instrument, a name of the customer, and so forth. The first payment service 102(1) can then attempt to authorize the payment instrument for the transaction (described below). In some instances, the first payment processing module 112 uses at least a portion of the first transaction data 104(1) to authorize the payment instrument. The first payment service 102(1) may then send an indication of whether the payment instrument has been approved or declined back to the first merchant device 110(1).

Generally, when a customer and a merchant enter into an electronic payment transaction, the transaction is processed by electronically transferring funds from a financial account associated with the customer to a financial account associated with the merchant. As such, the payment processing module 112 may communicate with one or more computing devices of a card network (or "card payment network") 116, e.g., MasterCard®, VISA®, over the network 114 to conduct financial transactions electronically. The payment processing module 112 can also communicate with one or more computing devices of one or more banks 118, processing/acquiring services, or the like over the network 114. For example, the payment processing module 112 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to customers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some instances, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

Similarly, in the example of FIG. 1, a second payment service 102(2) may authorize transactions for second merchants associated with second merchant device(s) 110(2). To authorize a respective transaction, the second payment service 102(2) may include a payment processing module (similar to the first payment service 102(1)) that may function to receive, via a network 114, information regarding the respective transaction from a second merchant device 110(2). The second payment service 1022(2) can then attempt to authorize the payment instrument for the transaction. In some instances, the payment processing module of the second payment service 102(2) uses at least a portion of the second transaction data 104(2) to authorize the payment instrument. The second payment service 102(2) may then send an indication of whether the payment instrument has been approved or declined back to the second merchant device 110(2).

In the example of FIG. 1, the first payment service 102(1) and the second payment service 102(2) may respectively send at least a portion of the first transaction data 104(1) and at least a portion of the second transaction data 104(2) to the central service 106. In response, the central service 106 can utilize the transaction data module 120 to store the at least the portion of the first transaction data 104(1) and the at least the portion of the second transaction data 104(2) in one or more databases, as represented by transaction data 108. In some instances, the central service 106 utilizes the encryption module 122 to encrypt the transaction data 108 such that the payment service 102(1)-(2) cannot access raw transaction data 108.

For instance, the encryption module 122 can utilize one or more encryption techniques to encrypt a portion of and/or an entirety of the transaction data 108. In some instances, the encryption module 122 can encrypt the transaction data 108 using blockchain techniques. Additionally, or alternatively, in some instances, the encryption module 122 can encrypt a portion of the transaction data 108 and/or an entirety of the transaction data 108 using any other encryption techniques that limit access to the transaction data 108 and/or modification of the transaction data 108. In such instances where the central service 106 performs encryption on the transaction data 108, the central service 106 can limit who has access to the transaction data 108 and/or who has access to portions of the transaction data 108.

Figure 2:
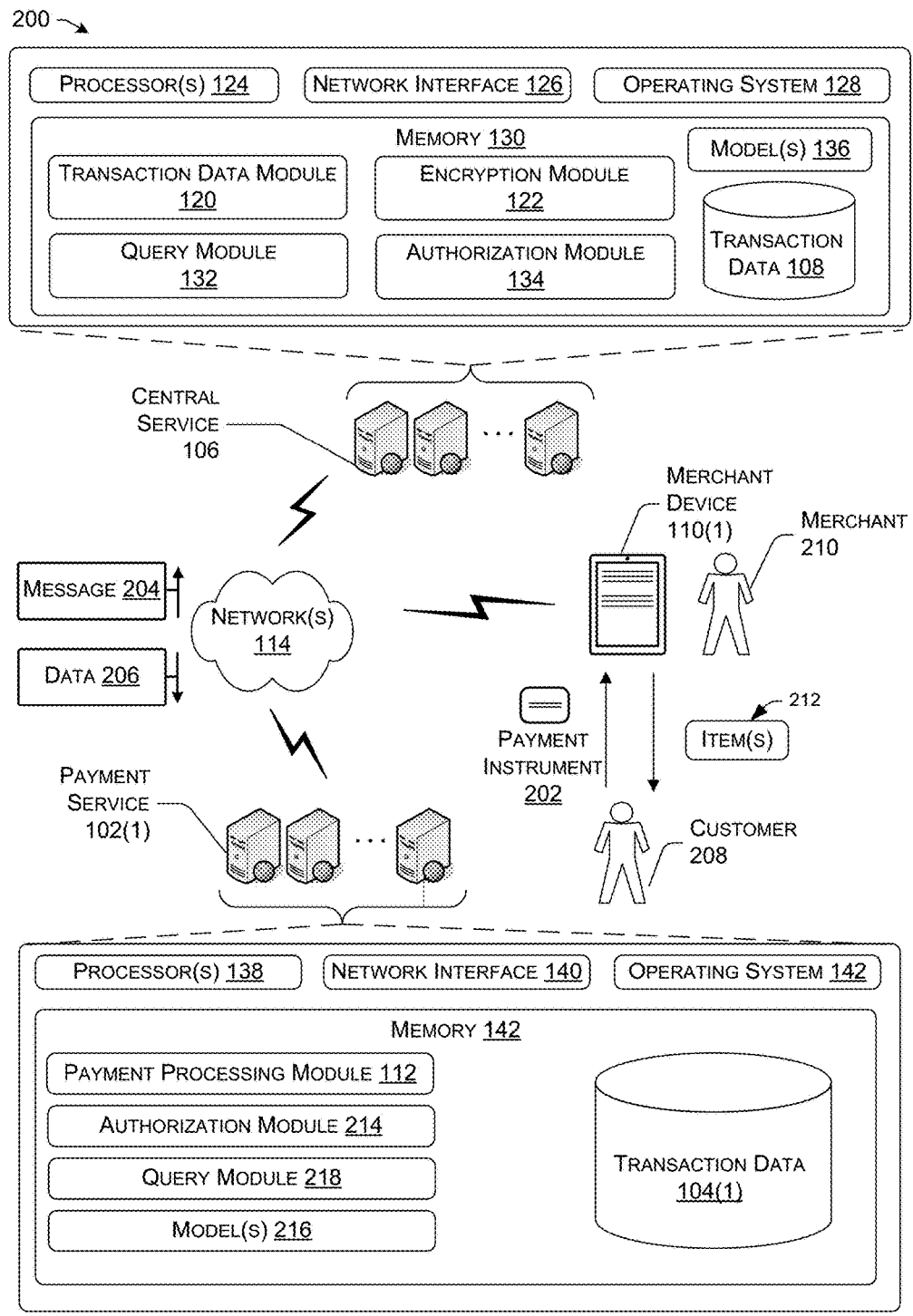
FIG. 2 illustrates an example environment that includes a payment service authorizing a payment instrument for a cost of a transaction. To authorize the transaction, the payment service sends a request for data associated with the payment instrument to the central service and receives the data in response. The payment service then uses the data to determine whether to authorize the payment instrument for the transaction.

Additionally, and as shown in FIG. 2, the central service 106 can utilize the transaction data 108 to authorize transactions for payment services 102(1)-(2) and/or utilize the transaction data 108 to respond to queries for data that are received from the payment services 102(1)-(2). For instance, in some examples, the central service 106 may receive a query from the payment service 102(1) for a portion of the transaction data 108, such transaction data 108 associated with a particular payment instrument. In such examples, the central service 106 may send the portion of the transaction data 108 to the payment service 102(1).

For another example, the central service 106 may receive a query from the payment service 102(1) for information associated with the transaction data 108. For instance, the query may request costs of previous transaction in which a payment instrument was utilized, geographical locations (e.g., shipping addresses, merchant locations) of previous transactions in which the payment instrument was utilized, a frequency of transactions in which the payment instrument was utilized (e.g., number of transactions per given time period), and/or the like. In response, the central service 106 can generate the information using at least a portion of the transaction data 108. The central service 106 can then send data representing the information back to the payment service 102(1).

It should be noted that, even though the example of FIG. 1 illustrates two payment services 102(1)-(2), in some instances, the central service 106 may receive and store transaction data 108 from any number of payment services. For instance, the central service 106 may receive and store transaction data 108 from two payment services, five payment services, one hundred payment services, or the like. Additionally, in such instances, each payment service can send messages to the central service 106 querying for data, and receive the data from the central service 106 in response.

As also shown in FIG. 1, the central service 106 includes processor(s) 124, network interface(s) 126, operating system 128, and memory 130, which stores transaction data module 120, encryption module 122, query module 132, authorization module 134, model(s) 136, and transaction data 108. Additionally, the first payment service 102(1) (and similarly, although not shown, the second payment service 102(2)) includes processor(s) 138, network interface(s) 140, operating system 142, and memory 144, which stores at least the payment processing module 112 and the first transaction data 104(1).

Network interface(s) 126 and network interface(s) 140, along with any other network interface(s) described herein, may include one or more interfaces and hardware components for enabling communication with various other devices over the network 114 or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

As discussed herein, processor(s), such as processor(s) 124 and processor(s) 138, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 130 and memory 144, may be an example of tangible non-transitory computer storage media and may include volatile and nonvolatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, devices, such as merchant device(s), the payment services, a customer device, central service, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

FIG. 2 illustrates an example environment 200 that includes the first payment service 102(1) authorizing a payment instrument 202 for a cost of a transaction. To authorize the payment instrument 202, the first payment service 102(1) sends a message 204 querying for data associated with the payment instrument 202 to the central service 106 and receives the data 206 in response. In some instances, the data 206 includes at least a portion of the transaction data 108. In some instances, the data 106 includes information associated with the transaction data 108 (e.g., not the raw transaction data 108). The first payment service 102(1) then analyzes the data 206 to determine whether to authorize the transaction.

For instance, and as illustrated in FIG. 2, a customer 208 may engage in a transaction with the merchant 210 to obtain item(s) 212 (and/or similarly service(s)). During the transaction, the customer 208 may provide the payment instrument 202 to the merchant 210, along with requests for item(s) 212 offered by the merchant 210. The merchant 210 may use the first merchant device(s) 110(1) (e.g., a POS device) for accepting payment from the customer 208.

As used in herein, merchant device(s) may comprise any sort of mobile or non-mobile devices that include instances of a merchant application that executes on the respective devices. The merchant application may provide POS functionality to the merchant device(s) to enable merchant (e.g., owner, employees, etc.) to accept payments from the customers. In some types of businesses, the merchant device(s) may correspond to a store or other place of business of the merchant, and thus, may be a fixed location that typically does not change on a day-to-day basis. In other types of businesses, however, the location of the merchant device(s) may change from time to time, such as in the case that the merchant operates a food truck, is a street vendor, is a cab driver, etc., or has an otherwise mobile business, e.g., in the case the merchant sells items at buyer's homes, places of business, and so forth.

Additionally, as used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction, such as the transaction between the merchant 210 and the customer 208 in FIG. 2, may include a financial transaction for the acquisition of goods and/or services that is conducted between a merchant and a customer. For example, when paying for a transaction, the customer 208 can provide the amount that is due to the merchant 210 using cash or other payment instrument 202 (e.g., a debit card, a credit card, a stored-value or gift card, a check, through an electronic payment application on a device carried by the customer, any electronic type payment, or the like). The merchant 210 can interact with the first merchant device 110(1) to process the transaction, such as by inputting (e.g., manually, using a magnetic card reader or an RFID reader, etc.) identifiers (e.g., payment information, such as a card number, account number, or any other account information) associated with the payment instrument 202. For example, the payment instrument 202 of the customer 208 may include one or more magnetic strips for providing card and customer information when swiped in a card reader. In other examples, the payment instrument 202 may include other types of payment cards may be used, such as smart cards having a built-in memory chip that is read by the device when the card is "dipped" into the reader, a radiofrequency identification tag, or so forth.

During the transaction between the merchant 210 and the customer 208, the first merchant device 110(1) can determine transaction information describing the transaction, such as the payment information of the payment instrument 202, a cost of the transaction, the item(s) 212 acquired by the customer 208, a time, place and date of the transaction, a card network associated with the payment instrument 202, an issuing bank of the payment instrument, a name of the customer 208, and so forth. The first merchant device 110(1) can send the transaction information (e.g., transaction data) to the first payment service 102(1) over a network 114, either substantially contemporaneously with the conducting of the transaction (in the case of online transactions) or later when the device is in the online mode (in the case offline transactions). In response, the first payment service 102(1) can then attempt to authorize the payment instrument 202 for the cost of the transaction.

For instance, an authorization module 214 of the first payment service 102(1) may utilize the first transaction data 104(1) and one or more model(s) 216 to authorize payment instruments for transactions. As discussed above, the first transaction data 104(1) can include historical transaction data associated with previous transactions that the first payment service 102(1) attempted to authorize for merchants. For instance, the first transaction data 104(1) associated with a payment instrument 202 can indicate a number of times that the first payment service 102(1) has attempted authorize the payment instrument 202, a frequency of transactions in which the payment instrument 202 is utilized, costs of transactions in which the payment instrument 202 was utilized, a time, place (e.g., geographical location), and date of the transactions in which the payment instrument 202 was utilized, whether each transaction was authorized or not authorized, one or more identities of customers that have utilized the payment instrument 202, and/or the like.

A model 216 can include one or more rules that analyze the first transaction data 104(1) and/or the received transaction data from the first merchant device 110(1) to determine a score (e.g., a risk score) associated with authorizing the payment instrument 202. For example, a model 216 can include a first rule that compares the cost of the current transaction being authorized to costs of previous transactions in which the payment instrument 202 was utilized to determine whether the cost of the current transaction falls within a range. In some instances, the range can include the lowest cost of a previous transaction in which the payment instrument 202 was authorized to the highest cost of a previous transaction in which the payment instrument 202 was authorized. Additionally, or alternatively, in some instances, the first rule may allow authorization of transactions in which the cost of the transaction traverses the highest cost of a previous transaction. For instance, the first rule may allow authorization based on the cost of the current transaction traversing the highest cost by a threshold (e.g., standard deviation, a given percentage, etc.).

For a second example, a model 216 can additionally, or alternatively, include second rule that compares the geographic location in which the current transaction is being conducted to geographical locations of previous transactions in which the payment instrument 202 was utilized to determine whether the geographical location is within a geographic region. The geographic region can include a city, state, country, and/or any other geographic region set by the second rule. In some instances, when a transaction occurs between an online marketplace of a merchant and a customer, the geographical locations can each include shipping addresses. For instance, the second rule can compare the shipping address of the current transaction to shipping addresses of previous transactions in which the payment instrument 202 was utilized in online marketplace transactions to determine whether the shipping address is within the geographic region For a third example, a model 216 can additionally, or alternatively, include a third rule that compares a frequency in which the payment instrument 202 is currently being utilized to a frequency in which the payment instrument 202 was utilized in previously transactions to determine whether there is a discrepancy in the frequency. For instance, the third rule can determine whether the payment instrument 202 is being utilized at a greater frequency than average as indicated by the first transaction data 104(1). In some instances, the third rule may utilize a given time period when comparing frequencies. For instance, the third rule may consider a frequency of transactions for the last day, week, month, year, and/or the like.

After determining the score using the one or more model(s) 216, the authorization module 214 can compare the score to a threshold score to determine whether to authorize the payment instrument 202 for the cost of the transaction. For instance, in some examples, the authorization module 214 can authorize the payment instrument 202 for the transaction based on the score not traversing the threshold score. Alternatively, the authorization module 214 may not authorize the payment instrument 202 for the transaction based on the score traversing the threshold score. As discussed above, in some instances, a score range can include 0-100 when attempting to authorize payment instruments, and the threshold score can include any number between 0 and 100. Additionally, or alternatively, in some instances, the score range can include any range (e.g., 0-10, 0-1000, etc.), and the threshold score can include any number that falls within the range.

In some instances, the first payment service 102(1) may further request data from the central service 106, and then use received data when authorizing the payment instrument 202. For instance, the first payment service 102(1) can utilize the query module 218 to generate and send the central service 106 a message 204, where the message 204 includes at least payment information associated with the payment instrument 202 and a query for data associated with the payment instrument 202. In some instances, the query can request information associated with a type of data. The type of data can include costs of previous transactions in which the payment instrument 202 was utilized, geographic locations of the previous transactions in which the payment instrument 202 was utilized, a frequency in which the payment instrument 202 is utilized, identities of customers that utilized the payment instrument 202 in the previous transactions, and/or the like. The central service 106 can receive the message 204 from the first payment service 102(1) and, in response, analyze the stored transactions data 108 (from all of the payment services 102(1)-(2)) to identify the data associated with the query.

For instance, in some examples, the central service 106 can utilize the query module 132 identify a first portion of the stored transaction data 108 that is associated with transactions in which the payment instrument 202 was utilized. If the query is for a specific type of data, the query module 132 can then analyze the first portion of the stored transaction data 108 to identify a second portion of the stored transaction data 108 that is associated with the type of data. In some instances, the central service 106 can then send the requested data 206 back to the first payment service 102(1), where the requested data 206 either includes the first portion of the stored transaction data 108 or the second portion of the stored transaction data 108. Additionally, if the transaction data 108 associated with the payment instrument 202 indicates any fraudulent transactions that included the payment instrument 202, the central service 106 can further send the first payment service 102(1) data indicating the fraudulent transactions.

Additionally, or alternatively, in some instances, the central service 106 can use the first portion of the transaction data 108 and/or the second portion of the transaction data 108 to generate information corresponding to the query. For example, if the query requests information describing geographical locations (e.g., states) in which the payment instrument 202 has previously been utilized, the query module 132 can utilize the second portion of the transaction data 108 (e.g., which may indicate the geographical locations) to generate information describing the geographical locations. For instance, the information may indicate that the payment information 202 has been utilized in the states of Washington, Oregon, and Montana.

For another example, the query may request information describing a frequency in which the payment instrument 202 is being utilized. For instance, the query may request "how many times has the payment instrument 202 been utilized in the last week?". Based on receiving the query, the query module 132 can analyze the first and/or second portion of the identified transaction data 108 and generate information describing the frequency in which the payment instrument 202 has been utilized in the last week. For instance, the information may indicate that the payment instrument 202 has been utilized three times in the last week.

In either of the above examples, the central service 106 can then send data 206 representing the generated information back to the first payment service 102(1). In some instances, when the central service 106 sends the data 206 representing the generated information, the central service 106 does not send the raw transaction data 108 that was utilized to generate the information. Therefore, in such instances, the first payment service 102(1) is only capable querying information associated with the transaction data 108, but the first payment service 102(1) is not able to access the raw transaction data 108 itself. This can provide security improvements to the system 100 of FIG. 1, as the transaction data 104(1)-(2) for each respective payment service 102(1)-(2) cannot be accessed by each of the other payment service(s) 102(1)-(2) that are part of the system 100.

The first payment service 102(1) can then attempt to authorize the transaction using the received data 206 and/or at least a portion of the first transaction data 104(1). For instance, the authorization module 214 can input the requested data 206, the at least the portion of the first transaction data 104(1), and/or the data received from the first merchant device 110(1) into one or more model(s) 216. The one or more model(s) 216 can analyze all of the inputted data and output a score in response. Using the score, the authorization module 214 can determine whether to authorize the payment instrument 202 for the cost of the transaction. For instance, the authorization module 214 can authorize the payment instrument 202 when the score does not traverse a threshold score. Additionally, the authorization module 214 may not authorize the payment instrument 202 when the score traverses the threshold score.

In some instances, the first payment service 102(1) can then send the first merchant device 110(1) a message indicating whether the payment instrument 202 was authorized for the cost of the transaction. For example, based on the score not traversing the threshold score, the first payment service 102(1) can send the first merchant device 110(1) a message indicating that the payment instrument 202 is authorized for the cost of the transaction. For another example, based on the score traversing the threshold score, the first payment service 102(1) can send the first merchant device 110(1) a message indicating that the payment instrument 202 is not authorized for the cost of the transaction.

In some instances, the first payment service 102(1) can further send the central service 106 transaction data associated with the current transaction between the merchant 210 and the customer 208. For instance, the first payment service 102(1) can send the central service 106 transaction data that includes an identifier of a customer 208, payment information associated with the payment instrument 202 used during the transaction, item(s) 212 (and/or similarly services) acquired by the customer 208, a cost of the item(s) 212 acquired by the customer 208, a time, place (e.g., geographical location), and date of the transaction, and so forth. In some instances, the first payment service 102(1) can send the central service 106 the transaction data concurrently with the first payment service 102(1) attempting to first authorize the transaction using the locally stored first transaction data 104(1). In other instances, the first payment service 102(1) can send the central service 106 the transaction data at any other time. The central service 106 can then use the transaction module 120 to store (either encrypted or not encrypted) the received transaction data along with the transaction data 108 in the one or more databases.

In some instances, in addition to, or alternatively from, sending the first payment service 102(1) the data 206, the central service 106 may utilize the authorization module 134 to authorize transactions between merchants and customers for payment services 102(1)-(2). For instance, the central service 106 may include model(s) 136 that the central service 106 uses to authorize transactions, similar the model(s) 216 described above. In some instances, one or more of the model(s) 136 may use similar rules as one or more of the model(s) 216. In some instances, one or more of the model(s) 136 may use different rules than one or more of the model(s) 216.

In some instances, the central service 106 uses the transaction data 108 when authorizing the transactions using the model(s) 136. In some instances, the central service 106 uses a specific model 136, as well as specific transaction data 108, based on the queries included in messages that are received from the payment services 102(1)-(2). For instance, the central service 106 may utilize a specific type of data from the transaction data 108 when authorizing the transaction between the merchant 210 and the customer 208.

For example, the first payment service 102(1) may send the central service 106 a message 204 requesting the central service 106 to authorize the transaction between the merchant 210 and the customer 208. The message 204 may include a portion of and/or all of the data (e.g., card data) that the first payment service 102(1) receives from the first merchant device 110(1). For instance, the message 204 may can include the payment information of the payment instrument 202, a cost of the transaction, the item(s) 212 acquired by the customer 208, a time, place and date of the transaction, a card network associated with the payment instrument 202, an issuing bank of the payment instrument, a name of the customer 208, and so forth. In some instances, the message 204 can further include a query that indicates that the first payment service 102(1) would like a specific type of the transaction data 108 analyzed when authorizing the transaction.

The central service 106 can receive the message 204 from the first payment service 102(1). In response, the central service 106 can analyze the transaction data 108 to identify a first portion of the transaction data 108 that is associated with the payment instrument 202. Additionally, if the query includes a specific type of data, the central service 106 can analyze the first portion of the transaction data 108 to identify a second portion of the transaction data 108 that is associated with the specific type of data. The central service 106 can then authorize the payment instrument 202 using the first portion and/or the second portion of the transaction data 108 and one or more model(s) 136.

For instance, the authorization module 134 can input the first and/or second portion of the transaction data 108, and/or the data received in the message 204, into one or more of the model(s) 136. In some instances, the central service 106 inputs the data into a model 136 that is specific to the type of data (e.g., includes rules associated with the type of data). The authorization module 134 can then determine a score based on analyzing the data using the one or more model(s) 136. Using the score, the authorization module 134 can determine whether to authorize the transaction using similar techniques as the first payment service 102(1) above. For instance, the authorization module 134 can authorize the payment instrument 202 when the score does not traverse a threshold score, and not authorize the payment instrument 202 when the score traverses the threshold score.

The central service 106 can then send the first payment service 102(1) data 206 indicating whether the payment instrument 202 was authorized, the score for the transaction, the portion of the transaction data 108 queried within the message 204, and/or information that the central service 106 generates based on receiving the query. The first payment service 102(1) can receive the data from the central service 106 and, in response, use the data to determine whether to authorize the transaction.

For instance, first payment service 102(1) can authorize the payment instrument 202 when the central service 106 authorizes the payment instrument 202 and not authorize the payment instrument 202 when the central service 106 does not authorize the payment instrument 202. Additionally, or alternatively, the first payment service 102(1) can perform the authorization techniques described above using the data 206 to determine whether to authorize the payment instrument 202 for the cost of the transaction. The first payment service 102(1) can then send the first merchant device 110(1) a message indicating whether the payment instrument 202 was authorized for the cost of the transaction.

It should be noted that, in some instances, the first payment service 102(1) first attempts to authorize the payment instrument 202 for the cost of the transaction using the one or more model(s) 216 and any historical first transaction data 104(1) that is stored by the first payment service 102(1). In such instances, the first payment service 102(1) may then send the message 204 to the central service 106 querying the additional data 206 based on the initial attempt determining that the payment instrument 202 is not authorized for the transaction, is authorized for the transaction, and/or both.

For instance, the first payment service 102(1) may first analyze the current transaction using a first model and the first transaction data 104(1) associated with the payment instrument 202. Based on the first analysis, the first payment service 102(1) may determine that a first score for authorizing the transaction traverses a first threshold score. In response, the first payment service 102(1) may send the message 204 to the central service 106 for the additional data 206. The first payment service 102(1) may then analyze the current transaction using at least one of the first model or a second model and the additional data 206 received from the central service 106. Based on the second analysis, the first payment service 102(1) may determine whether to authorize the payment instrument 202 for the current transaction.

In some instances, to authorize the current transaction based on the second analysis, the first payment service 102(1) may determine a second score using the second analysis. The first payment service 102(1) may then authorize the transaction based on the second score not traversing the first threshold score and/or a second threshold score, and not authorize the transaction based on the second score traversing the first threshold and/or the second threshold. Additionally, or alternatively, in some instances, the first payment service 102(1) may first determine a final score that is based on the first score and the second score. For example, the first payment service 102(1) may take the average of the first score and the second score to determine the final score. For a second example, the first payment service 102(1) may adjust the first score based on the second score to determine the final score. For a third example, the first payment service 102(1) may weigh the first score and/or the second score to determine the final score. The first payment service 102(1) may then authorize the transaction based on the final score not traversing the first threshold score and/or a second threshold score, and not authorize the transaction based on the final score traversing the first threshold and/or the second threshold.

While the example in FIG. 2 illustrates the first payment service 102(1) authorizing a single payment instrument 202 for a single transaction between a single merchant 210 and a single customer 208, in some instances, the first payment service 102(1) can perform similar processes to authorize payment instruments for multiple transactions between the merchants and customers. Additionally, the above describes the first payment service 102(1) requesting and using a single type of data to authorize the payment instrument 202. However, in some instances, the first payment service 102(1) may request multiple types of data when authorizing the payment instrument 202.

For example, the first payment service 102(1) may request and analyze a first type of data using a model 216 when authorizing the payment instrument 202 for the cost of the transaction. The first payment service 102(1) may determine that the payment instrument 202 is not authorized for the cost of the transaction based on the first analysis. In response, the first payment service 102(1) may request and analyze a second type of data using a model 216 when authorizing the payment instrument 202 for the cost of transaction. The first payment service 102(1) may then determine that the payment instrument 202 is authorized for the cost of the transaction based on the second analysis.

In the example above, the first payment service 102(1) may use a first model to analyze the first type of data and either the first model or a second model to analyze the second type of data. For instance, the first model may include one or more first rules that are specific to the first type of data, such as determining whether the cost of the current transaction is outside of a cost range. Additionally, the second model may include one or more second rules that are specific to the second type of data, such as determining whether the geographic location of the current transaction is outside of a region.

Although not illustrated in FIG. 2, the second payment service 102(2) may perform similar processes as the first payment service 102(1) when processing transactions for merchants. As discussed above, in some instances, each payment service 102(1)-(2) may utilize a respective model that is tailored to (includes rules specific to) the type of data analyzed by the respective payment service 102(1)-(2). As such, in some instances, the central service 106 may receive messages from each of the payment services 102(1)-(2) authorizing the same payment instrument, where each message queries a different type of data. In such instances, the central service 106 can identify the respective type of data that is queried by each payment service 102(1)-(2) and send the respective data to each payment service 102(1)-(2) in response.

For instance, the first payment service 102(1) may send a message 204 to the central service 106 that queries first information describing a first type of data associated with the payment instrument 202 when authorizing the payment instrument 202 for a first merchant In response, the first payment service 102(1) can receive data representing the first information from the central service 106 and use the first information to authorize the payment instrument 202. Additionally, the second payment service 102(2) may send a message to the central service 106 that queries second information describing a second type of data associated with the payment instrument 202 when authorizing the payment instrument 202 for a second merchant. In response, the second payment service 102(2) can receive data representing the second information from the central service 106 and use the second information to authorize the payment instrument 202.

It should be noted that, in some instances, the first transaction data 104(1), the second transaction data 104(2), and/or the transaction data 108 can further include information indicating merchant(s) and/or customer(s) that have previously performed fraudulent transactions. In such instances, the central service 106 can send payment services 102(1)-(2) data indicating that a merchant or customer has performed a fraudulent transaction when messages received by the central service 106 indicate the merchant or customer. The payment services 102(1)-(2) can then further use such data when authorizing a payment instrument for a transaction. For example, the first payment instrument 102(1) may not authorize a payment instrument for a transaction when data indicates that one or more of the merchant or the customer conducting the transaction has a history of conducting fraudulent transactions. For another example, the first payment service 102(1) may use the data indicating that the merchant or the customer has a history of conducting fraudulent transactions when calculating the risk scores described above (e.g., increase a risk score for a transaction).

Furthermore, in some instances, the first transaction data 104(1), the second transaction data 104(2), and/or the transaction data 108 can further include information indicating payment instruments that have been utilized in fraudulent transactions. In such instances, the central service 106 can send payment services 102(1)-(2) data indicating that payment instruments have been utilized in fraudulent transactions when messages received by the central service 106 indicate the payment instruments. The payment services 102(1)-(2) can then further use such data when authorizing a payment instrument for a transaction. For example, the first payment instrument 102(1) may not authorize a payment instrument for a transaction when data indicates that the payment instrument has been utilized in a fraudulent transaction. For another example, the first payment service 102(1) may use the data indicating that the payment instrument has been utilized in a fraudulent transaction when calculating the risk scores (e.g., increase a risk score for a transaction).

It should further be noted that, the examples of FIGS. 1 and 2 illustrate using a central service 106 to query data (e.g., a central database). However, in some instances, in addition to or alternatively from using the central service 106, a distributed database may be used to store the transaction data 104(1)-(2) from each of the payment services 102(1)-(2). In some instances, the distributed database may include a blockchain database in which the payment services 102(1)-(2) send the transaction data 104(1)-(2). Additionally, the payment services 102(1)-(2) may be able to send messages to the distributed database querying for data using similar processes as described above.

Furthermore, it should be noted that the processes described above can be utilized for transactions that occur at online marketplaces of merchants (e.g., websites or other network resources in which customers can purchase items and/or services from merchants). For instance, rather than a customer conducting a transaction at a physical establishment of a merchant, the customer may conduct the transaction using an online marketplace of the merchant. The online marketplace can then send the message querying the data to the central service 106, receive the data from the central service 106, and then perform the risk analysis using the received data.

Figure 3A:
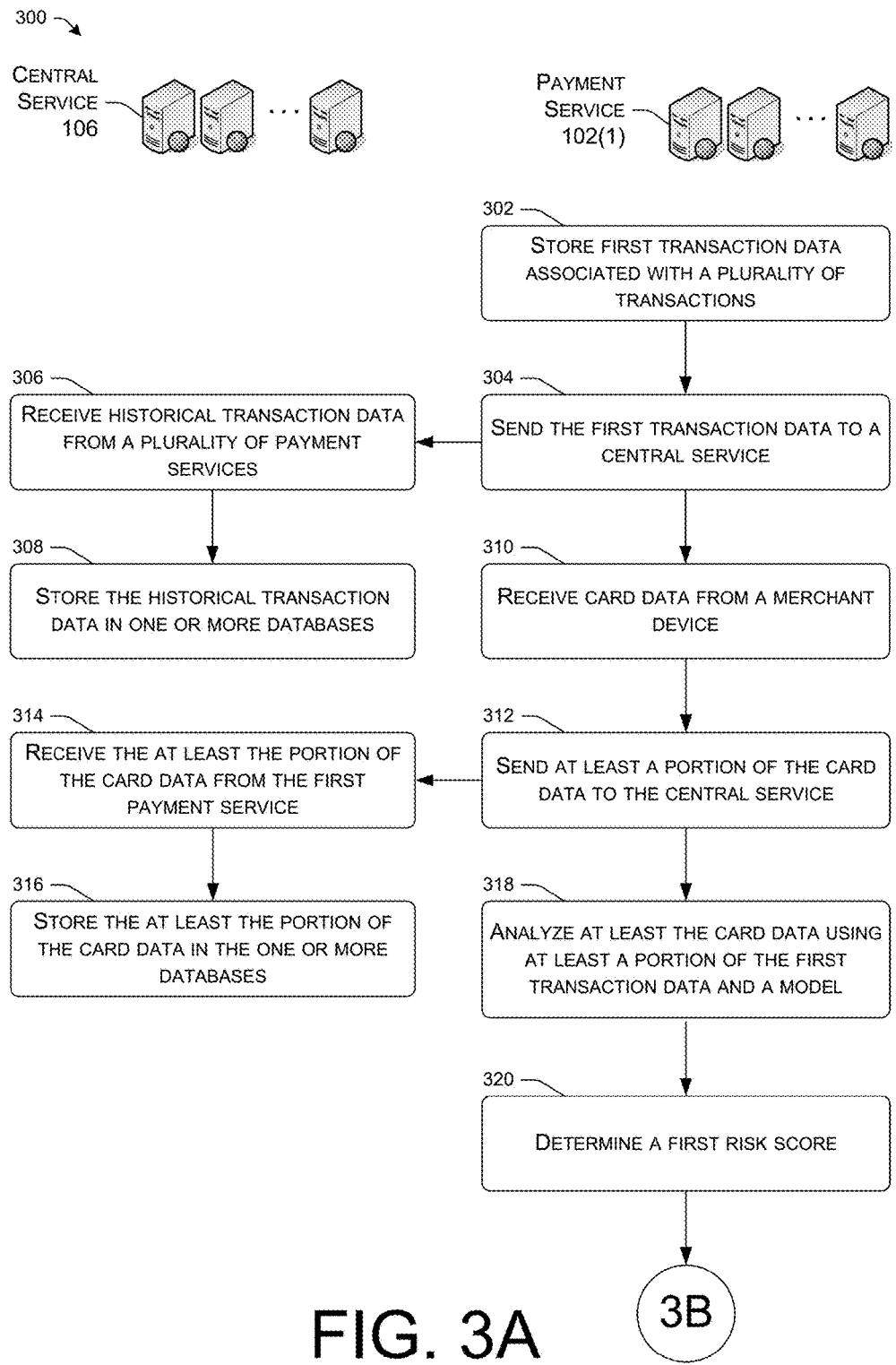
FIGS. 3A-3C illustrate a flow diagram of an example process for storing transaction data at a central service and then utilizing the transaction data to authorize a payment instrument during a transaction.
Figure 3B:
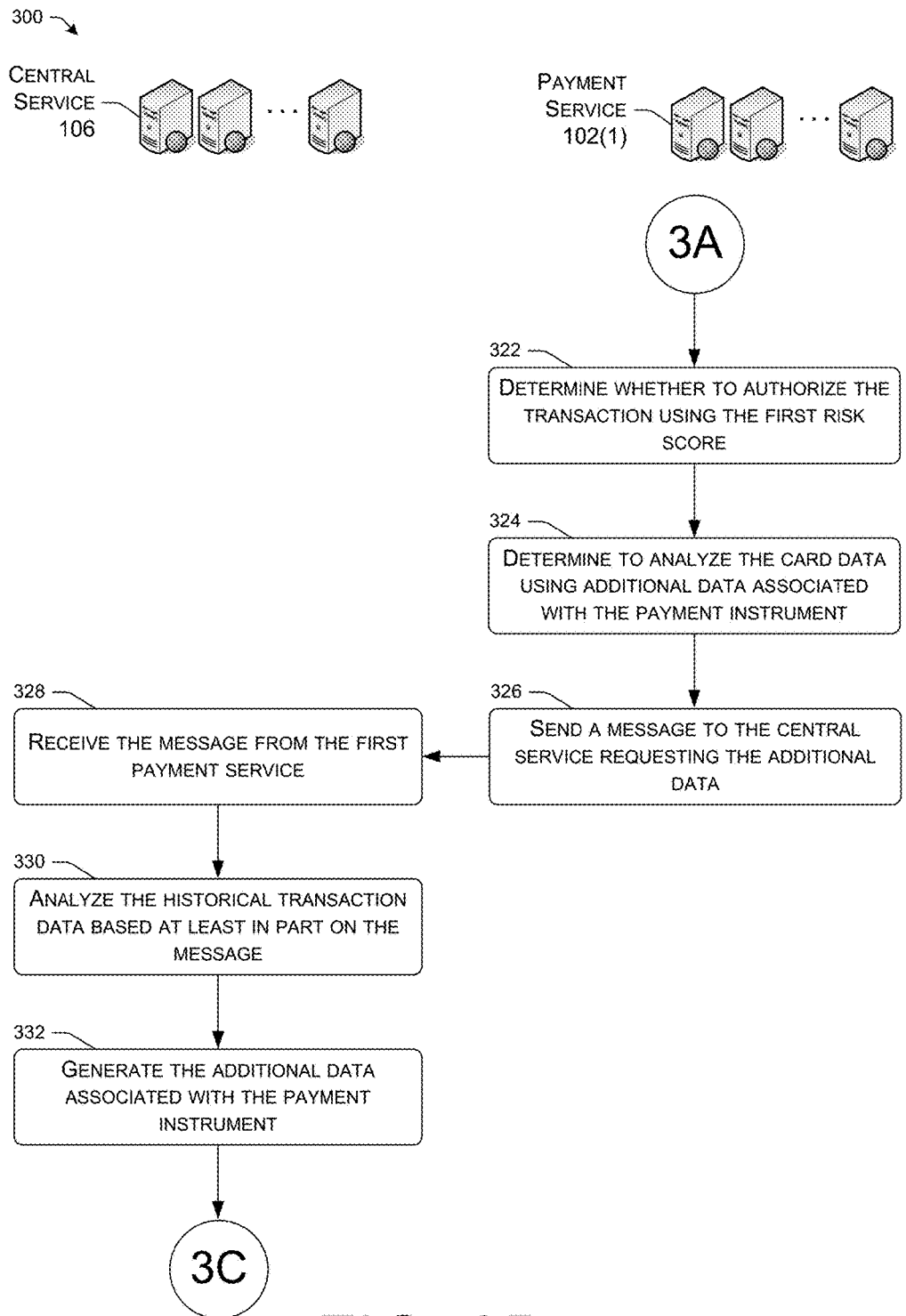
Figure 3C:
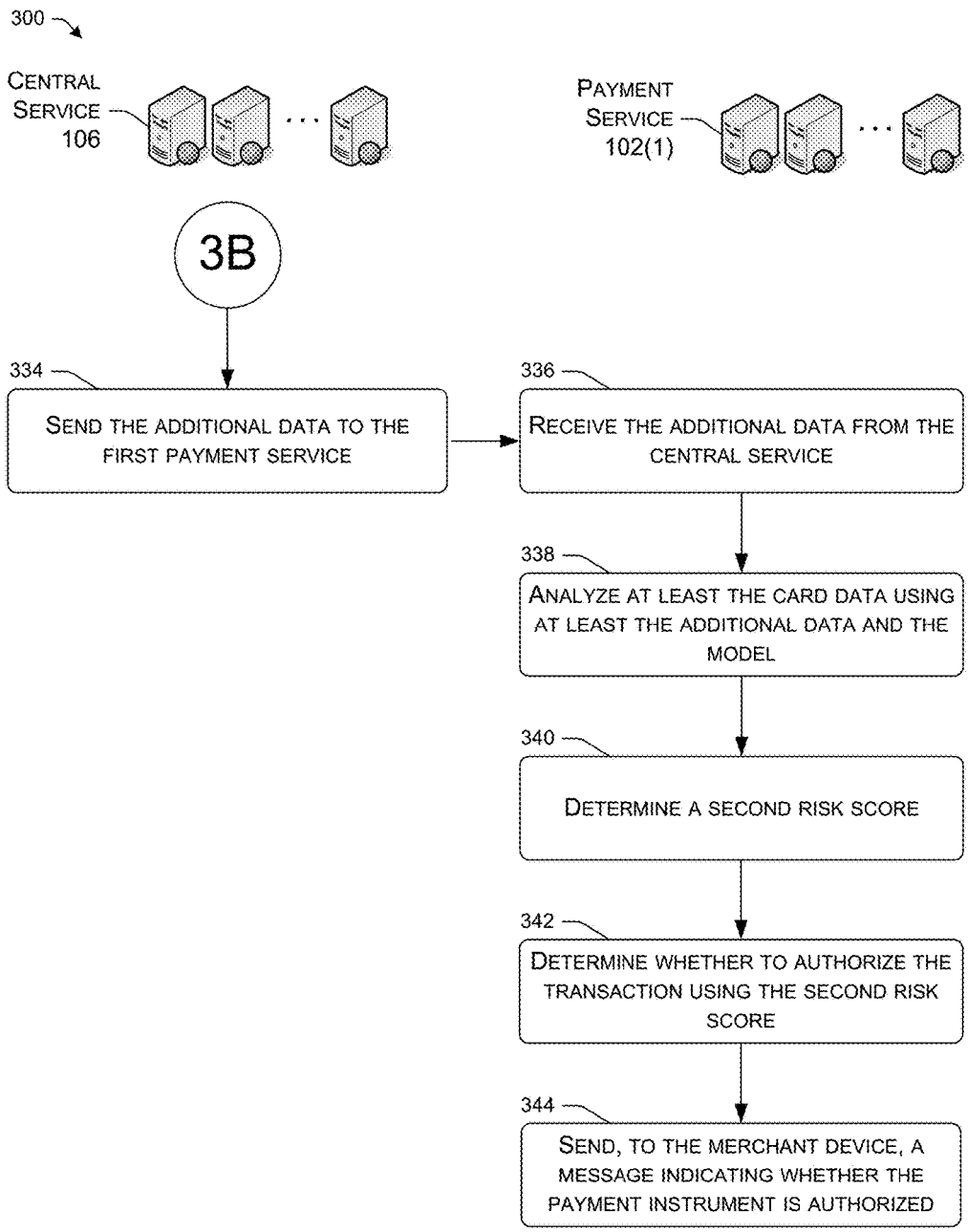

FIGS. 3A-3C illustrate a flow diagram of an example process 300 for storing transaction data at a central service and then utilizing the transaction data to authorize a payment instrument during a transaction. The process 300, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 300, and other processes described herein, may be performed by a payment service, a central service, a merchant device, a customer device, an additional electronic device, or by a combination thereof.

At 302, a first payment service 102(1) stores first transaction data associated with a plurality of transactions. For instance, the first payment service 102(1) may authorize payment instruments for transactions that are conducted between merchants and customers. The first payment service 102(1) may store first transaction data associated with the transactions and later use the first transaction data to process subsequent transactions that include the payment instruments. As discussed above, the first transaction data for each transaction can indicate an identifier of a customer, payment information associated with a payment instrument used during the respective transaction, item(s) acquired by the customer, a cost of the item(s) acquired by the customer, a time, place (e.g., geographical location), and date of the respective transaction, and so forth.

At 304, the first payment service 102(1) sends the first transaction data to a central service 106. For instance, the first payment service 102(1), as well as at least one other payment service that also processes transactions for merchants, may send first transaction data to the central service 106. The payment services can then send messages to the central service 106 to query data (e.g., the transaction data and/or information associated with the transaction data) when authorizing transactions for merchants.

At 306, the central service 106 receives historical transaction data from a plurality of payment services and at 308, the central service 106 stores the historical transaction data in one or more databases. For instance, the central service 106 can receive the historical transaction data from a plurality of payment services, which includes the first transaction data from the first payment service 102(1). The central service 106 can then store the historical transaction in one or more databases. In some instances, the central service 106 first encrypts the historical transaction data using one or more encryption techniques before storing the historical transaction data in the one or more databases.

At 310, the first payment service 102(1) receives card data from a merchant device. For instance, the first payment service 102(1) can receive, from the merchant device, a request to authorize a payment instrument for a cost of a transaction. In some instances, the request can include at least payment information associated with a payment instrument (e.g., the card data), item(s) being acquired by the customer, the cost(s) of the item(s), the total cost of the transaction, a time, place (e.g., geographical location), and date of the transaction, and/or the like.

At 312, the first payment service 102(1) sends at least a portion of the card data to the central service 106. For instance, based on receiving the card data from the merchant device, the first payment service 102(1) can send at least a portion of the card data to the central service 106. In some instances, the first payment service 102(1) can send the at least the portion of the card data to the central service 106 concurrently with analyzing the card data to authorize the payment instrument for the transaction (described in the steps below).

At 314, the central service 106 receives the at least the portion of the card data from the first payment service 102(1) and at 316, the central service 106 stores the at least the portion of the card data in the one or more databases. For instance, based on receiving the at least the portion of the card data, the central service 106 can store (either encrypted or not encrypted) the at least the portion of the card data in the one or more databases along with the historical transaction data received from the payment services.

At 318, the first payment service 102(1) analyzes at least the card data using at least a portion of the first transaction data and a first model and at 320, the first payment service 102(1) determines a first risk score. For instance, the first payment service 102(1) can analyze the transaction and the card data using a model and a portion of the first transaction data that is associated with the payment instrument. In some instances, based on the model, the portion of the first transaction data may include a specific type of data associated with the payment instrument. Based on the analysis, the first payment service 102(1) can calculate a first risk score for authorizing the payment instrument for the transaction.

At 322, the first payment service 102(1) determines whether to authorize the transaction using the first risk score. For instance, the first payment service 102(1) can determine to authorize the payment instrument for a cost of the transaction based on the first risk score not traversing a threshold risk score. Additionally, the first payment service 102(1) can determine to not authorize the payment instrument for the cost of the transaction based on the first risk score traversing the threshold risk score.

At 324, the first payment service 102(1) determines to analyze the card data using additional data associated with the payment instrument. For instance, in some examples, the first payment service 102(1) can determine to analyze the card data using the additional data based on the first risk score traversing the threshold risk score. In some examples, the first payment service 102(1) can determine to analyze the card data using the additional data based on the first risk score not traversing the threshold risk score. In some instances, the first payment service 102(1) uses the model and/or an additional model to analyze the additional data.

For instance, at 326, the first payment service 102(1) sends a message to the central service 106 requesting the additional data associated with the payment instrument and at 328, the central service 106 receives the message from the first payment service 102(1). For instance, based on the first risk score traversing the threshold risk score, the first payment service may send a query to the central service for the additional data associated with the payment instrument. As discussed above, in some instances, the query can indicate a type of data associated with the payment instrument. In some instances, the query can request raw historical transaction data associated with the payment instrument. In some instances, the query can request information describing the historical transaction data associated with the payment instrument At 330, the central service 106 analyzes the historical transaction data based at least in part on the message and at 332, the central service 106 generates the additional data associated with the payment instrument. For instance, the central service 106 may analyze the historical transaction data to identify a first portion of the historical transaction data that is associated with the payment instrument. In some instances, when the query indicates a type of data, the central service 106 may further analyze the first portion of the historical transaction data to identify a second portion of the historical transaction data that is associated with the type of data. The central service 106 can then use the first and/or second portion of the historical transaction data to generate the additional data for the first payment service 102(1).

For instance, in some examples, generating the additional data may include using the first and/or second portion of the historical data as the additional data to send to the first payment service 102(1). Additionally, or alternatively, in some examples, the central service 106 generates information associated with the first and/or second portion the historical transaction data, where the additional data represents the information. For instance, if the query requests information about geographical locations (e.g., states) in which the payment instrument has previously been utilized, the central service can utilize the second portion of the historical transaction data (e.g., which may indicate the geographical locations) to generate information describing the geographical locations. For instance, the information may indicate that the payment information has been utilized in the states of Washington, Oregon, and Montana.

At 334, the central service 106 sends the additional data to the first payment service 102(1) and at 336, the first payment service 102(1) receives the additional data from the central service 106. For instance, based on identifying the additional data, the central service 106 can send the additional data queried by the first payment service 102(1) to the first payment service 102(1).

At 338, the first payment service 102(1) analyzes at least the card data using at least the additional data and the model and at 340, the first payment service 102(1) determines a second risk score. For instance, the first payment service 102(1) can apply the additional data to the model to calculate a second risk score. In some instances, applying the additional data can include the first payment service 102(1) analyzing the transaction and the card data using the at least the portion of the first transaction data, the additional data, and the model. In other instances, the first payment service 102(1) may not use the at least the portion of the first transaction data. In some instances, when analyzing the additional card data, the first payment service 102(1) may utilize a model that differs from the model used to determine the first risk score. Based on the analysis, the first payment service 102(1) can calculate a second risk score for authorizing the payment instrument for the transaction.

At 342, the first payment service 102(1) determines whether to authorize the transaction using the second risk score. In some instances, the first payment service 102(1) can determine to authorize the payment instrument for the transaction based on the second risk score not traversing the first threshold risk score and/or a second threshold risk score and determine to not authorize the payment instrument for the transaction based on the second risk score traversing the first threshold risk score and/or the second threshold risk score. Additionally, or alternatively, in some instances, the first payment service 102(1) determines a final risk score based on the first risk score and the second risk score. The first payment service 102(1) can then determine to authorize the payment instrument for the transaction based on the final risk score not traversing the first threshold risk score and/or a second threshold risk score and determine to not authorize the payment instrument for the transaction based on the final risk score traversing the first threshold risk score and/or the second threshold risk score.

At 344, the first payment service 102(1) sends, to the merchant device, a message indicating whether the payment instrument is authorized. For instance, the first payment service 102(1) can send the merchant device a message indicating that the payment instrument was authorized for the cost of the transaction when the first payment service 102(1) determines that the payment instrument is authorized. Alternatively, the first payment service 102(1) can send the merchant device a message indicating that the payment instrument was not authorized for the cost of the transaction when the first payment service 102(1) determines that the payment instrument is not authorized.

Figure 4:
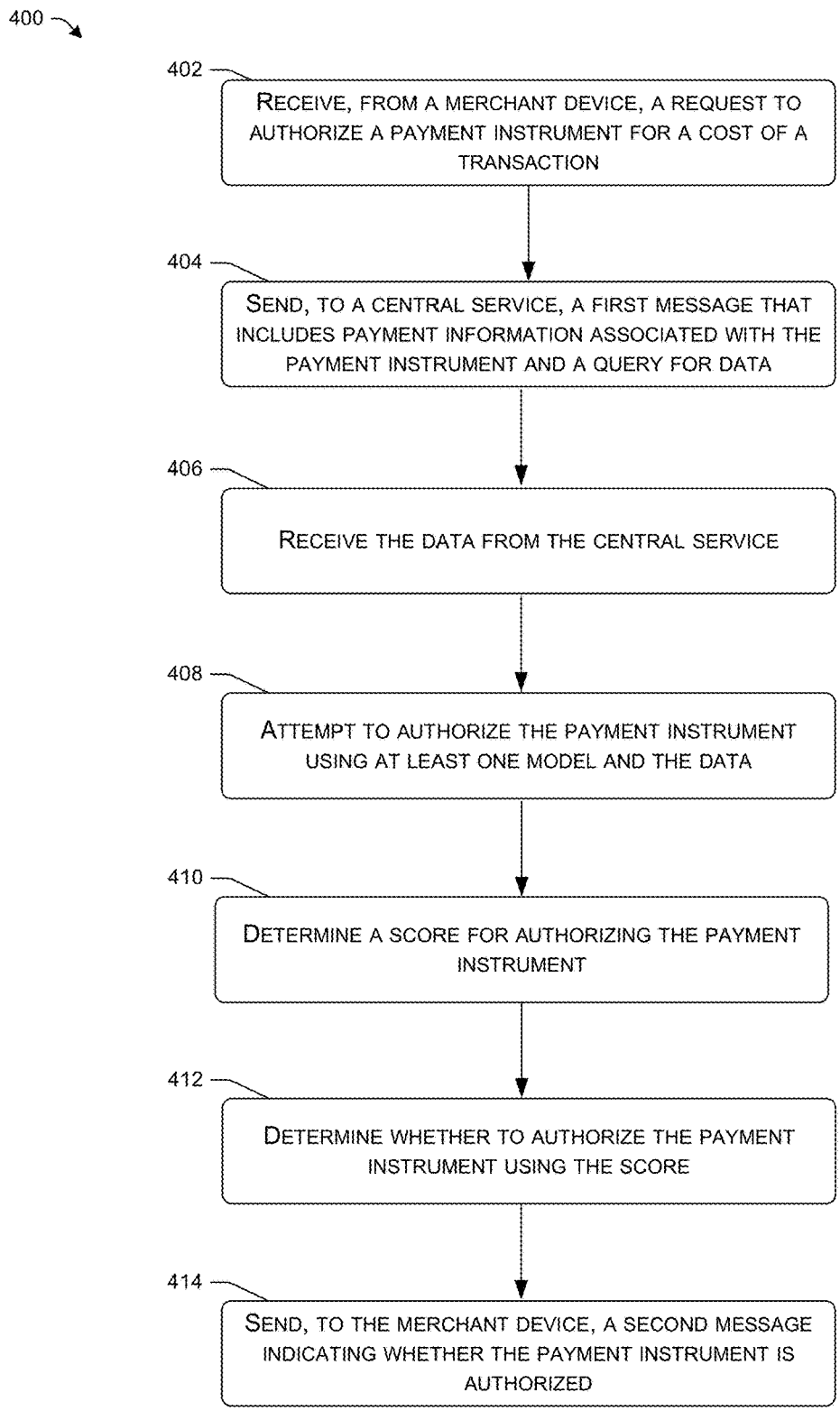
FIG. 4 illustrates a flow diagram of an example process for querying data from a central service and then utilizing the data to authorize a transaction.

FIG. 4 illustrates a flow diagram of an example process 400 for querying data from a central service and then utilizing the data to authorize a transaction. At 402, a first payment service 102(1) receives, from a merchant device, a request to authorize a payment instrument for a cost of a transaction. For instance, the first payment service 102(1) may authorize payment instruments for merchants, such as the merchant, based on receiving requests from respective merchant devices of the merchants. The request can include card data, such as payment information associated with the payment instrument.

At 404, the first payment service 102(1) sends, to a central service, a first message that includes payment information associated with the payment instrument and a query for data. For instance, to authorize the payment instrument, the first payment service 102(1) may send the message to the central service that requests the data associated with the payment instrument. In some instances, the query may indicate a type of data, such as costs of previous transactions in which the payment instrument was utilized, geographical locations of the previous transactions in which the payment instrument was utilized, times that the previous transactions in which the payment instrument was utilized, a frequency of the previous transactions in which the payment instrument was utilized, and/or the like.

At 406, the first payment service 102(1) receives the data from the central service. For instance, based on sending the first message, the first payment service 102(1) can receive the data from the central service. In some instances, the data includes raw historical transaction data stored by the central service. In some instances, the data represents information associated with the historical transaction data. For instance, if the first payment service 102(1) queries geographical locations in which the payment instrument has been utilized, the information may include a list of states.

At 408, the first payment service 102(1) attempts to authorize the payment instrument using at least one model and the data. For instance, based on receiving the data, the first payment service 102(1) can input the data and the card data into a model that outputs a score associated with authorizing the payment instrument. As discussed above, each model can include one or more rules for determining the score, and the first payment service 102(1) can select a model based on the type of data queried by the first payment service 102(1).

At 410, the first payment service 102(1) determines a score for authorizing the payment instrument and at 412, the first payment service 102(1) determines whether to authorize the payment instrument using the score. For instance, the first payment service 102(1) can determine the score based on the output of the at least one model. The first payment service 102(1) can then determine to authorize the payment instrument based on the score not traversing a threshold score, or determine to not authorize the payment instrument based on the score traversing g the threshold score.

At 414, the first payment service 102(1) sends, to the merchant device, a second message indicating whether the payment instrument is authorized. For instance, the first payment service 102(1) can send the merchant device a message indicating that the payment instrument was authorized for the cost of the transaction when the first payment service 102(1) determines that the payment instrument is authorized. Alternatively, the first payment service 102(1) can send the merchant device a message indicating that the payment instrument was not authorized for the cost of the transaction when the first payment service 102(1) determines that the payment instrument is not authorized.

It should be noted that, in some instances, the query may indicate more than one type of data associated with the payment instrument. In such instances, the first payment service 102(1) can attempt to authorize the payment instrument using a first model that is associated with a first type of data and also attempt to authorize the payment instrument using a second model that is associated with a second type of data. In such instances, the first payment service 102(1) may authorize the payment instrument for the cost of the transaction based on a first score associated with the first model not traversing a first threshold score and/or a second score associated with the second model not traversing the first threshold score or a second threshold score.

Additionally, or alternatively, the first payment service 102(1) may determine a final score based on the first score and the second score. In some instances, the final score can include an average of the first score and the second score. In some instances, the first score or the second score may be given more weight when determining the final score. The first payment service 102(1) can then determine to authorize the payment instrument based on the final score not traversing a threshold score or determine to not authorize the payment instrument for the transaction based on the final score traversing the threshold score.

Figure 5:
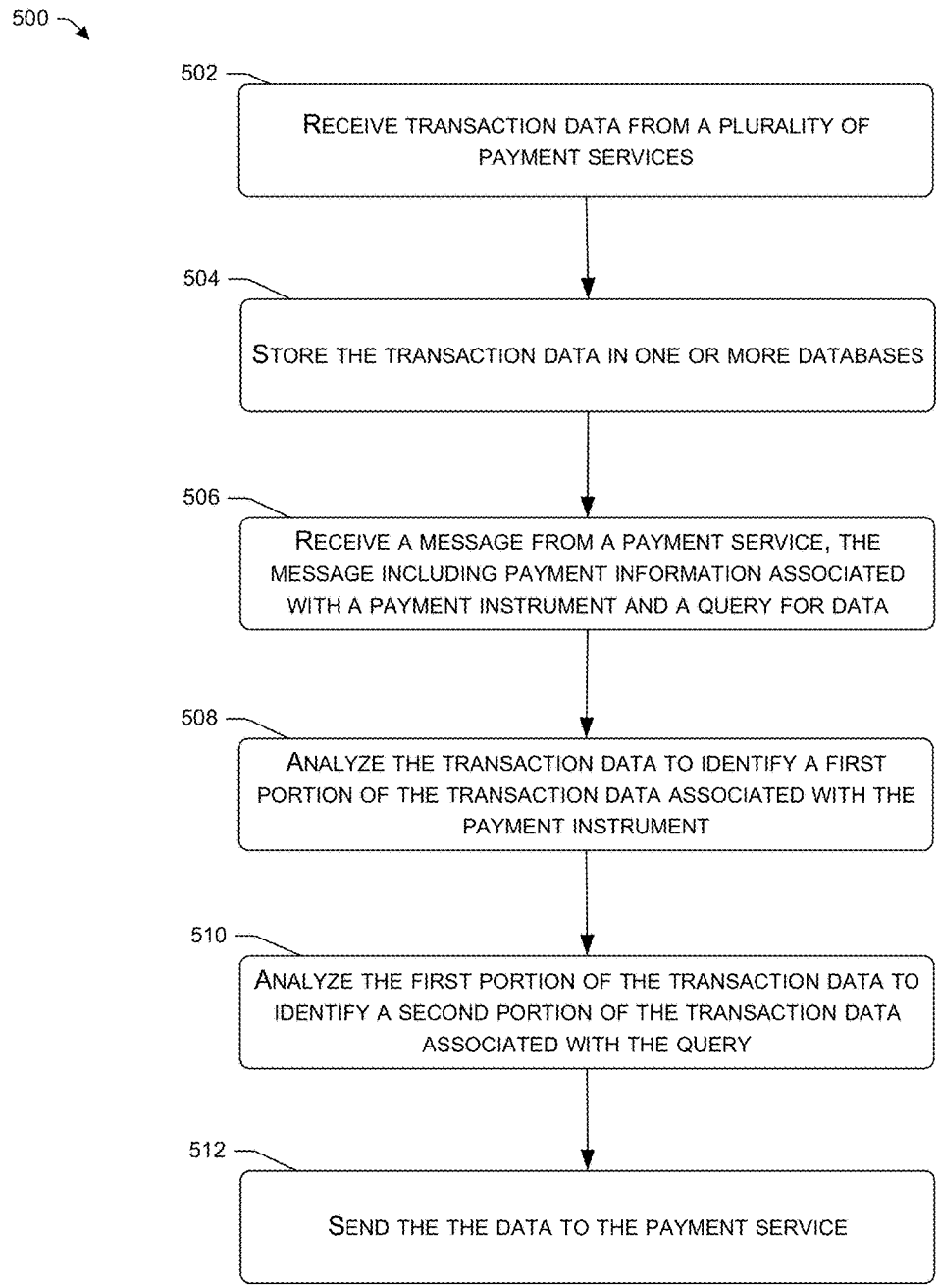
FIG. 5 illustrates a flow diagram of an example process for storing transaction data from a plurality of payment services and then sending data to a payment service based on receiving a query.

FIG. 5 illustrates a flow diagram of an example process 500 for storing transaction data from a plurality of payment services, and then sending data to a payment service based on receiving a query. At 502, a central service 106 receives transaction data from a plurality of payment services and at 504, the central service 106 stores the transaction data in one or more databases. For instance, the central service 106 may receive and store transaction data from payment services that authorize payment instruments for merchants In some instances, the central service 106 encrypts the stored transaction data such that the payment services cannot access the transaction data. The central service 106 can then send data (e.g., information and/or stored transaction data) to the payment services based on receiving queries.

At 506, the central service 106 receives a message from a payment service, the message including at least payment information associated with a payment instrument and a query for data and at 508, the central service 106 analyzes the transaction data to identify a first portion of the transaction data associated with the payment instrument. For instance, based on receiving the message, the central service 106 can analyze the stored transaction data to identify a first portion of the transaction data that is associated with previous transactions in which the payment instrument was utilized.

At 510, the central service 106 analyzes the first portion of the transaction to identify a second portion of the transaction data associated with the query. For instance, based on the query indicating a type of data, the central service 106 can analyze the first portion of the transaction data to identify a second portion of the transaction data that is associated with the type of data. As discussed above, the type of data can include costs of previous transactions in which the payment instrument was utilized, geographical locations of the previous transactions in which the payment instrument was utilized, times of the previous transactions in which the payment instrument was utilized, a frequency of previous transaction in which the payment instrument was utilized, and/or the like.

At 512, the central service 106 sends the data to the payment service. For instance, in some examples, based on identifying the second portion of the transaction data, the central service 106 can send the second portion of the transaction data to the payment service. In other examples, the central service 106 first generates information associated with the identified transaction data. For instance, if the query requests geographical locations in which the payment instrument was utilized, the information can include a list of geographical locations. The central service then send data representing the information to the payment service.

It should be noted that, in some instances, the query may not indicate a type of data. In such instances, the central service 106 may send the payment service the first portion of the transaction data and/or generate information associated with the first portion of the transaction data. Additionally, in some instances, the query may indicate multiple types of data. In such instances, the central service 106 may identify and send the payment service portions of the transaction data that are associated with each type of data and/or generates and send information that is associated with each type of data.

Figure 6:
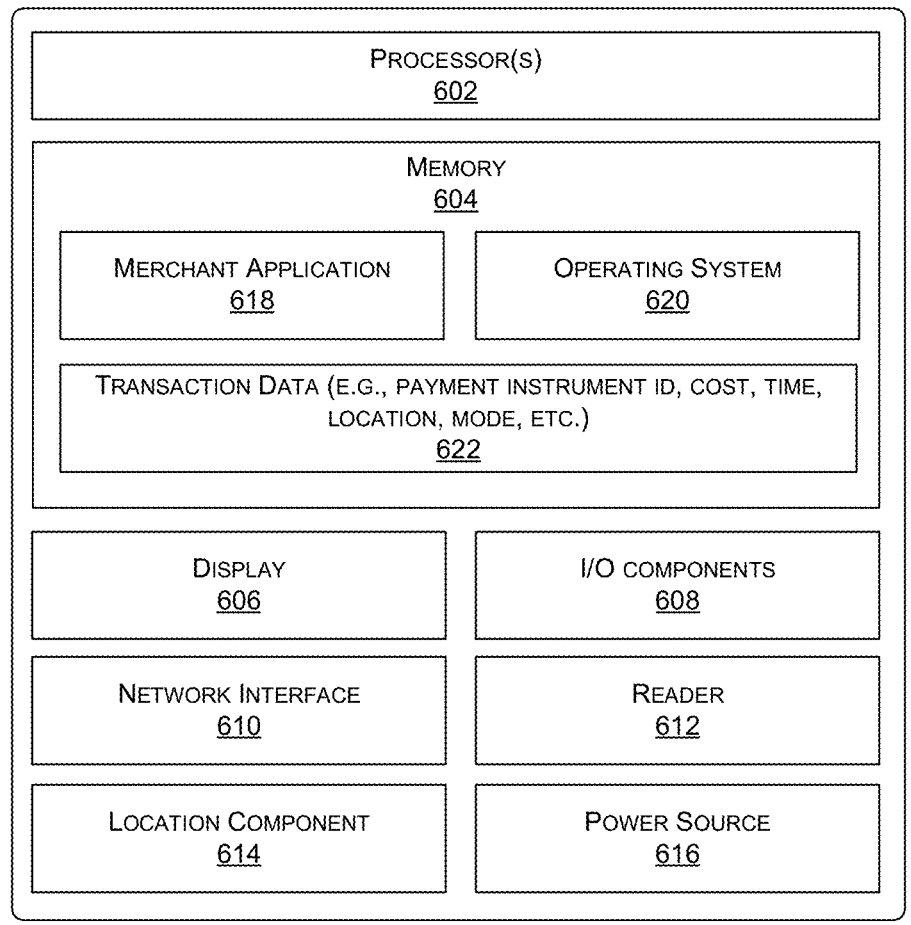
FIG. 6 illustrates select components of a merchant device that merchants described herein may utilize.

FIG. 6 illustrates select example components of an example POS device 600 according to some implementations. The POS device 600 may include any of the first merchant device(s) 110(1) or the second merchant device(s) 110(2). The POS device 600 may be any suitable type of computing device, e.g., mobile, semi-mobile, semi-stationary, or stationary. Some examples of the POS device 600 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 600 includes at least one processor 602, memory 604, a display 606, one or more input/output (I/O) components 608, one or more network interfaces 610, at least one card reader 612, at least one location component 614, and at least one power source 616. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some cases, the processor 602 may be one or more hardware processors and/or logic circuits of any suitable type specifically programmed or configured to execute the algorithms and processes described herein. The processor 602 can be configured to fetch and execute computer-readable processor-executable instructions stored in the memory 604.

Depending on the configuration of the POS device 600, the memory 604 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 604 may include, but is not limited to, RAM, ROM, EEPROM, flash memory, solid-state storage, magnetic disk storage, optical storage, and/or other computer-readable media technology. Further, in some cases, the POS device 600 may access external storage, such as RAID storage systems, storage arrays, network attached storage, storage area networks, cloud storage, or any other medium that can be used to store information and that can be accessed by the processor 602 directly or through another computing device or network. Accordingly, the memory 604 may be computer storage media able to store instructions, modules or components that may be executed by the processor 602. Further, when mentioned, non-transitory computer-readable media exclude media such as energy, carrier signals, electromagnetic waves, and signals per se.

The memory 604 may be used to store and maintain any number of functional components that are executable by the processor 602. In some implementations, these functional components comprise instructions or programs that are executable by the processor 602 and that, when executed, implement operational logic for performing the actions and services attributed above to the POS device 600. Functional components of the POS device 600 stored in the memory 604 may include a merchant application 618, which may interact with applications executing on client devices to allow customers to pay for items offered by the merchant. The merchant application 618 may present an interface on the POS device 600 to enable the merchant to conduct transactions, receive payments, and so forth, as well as communicating with a payment service for processing payments and sending transaction information. Further, the merchant application 618 may present an interface to enable the merchant to manage the merchant's account, and the like. Finally, the merchant application 618 may send data associated with the merchant to the payment service, and receive suggested gift card orders and values to associate with gift cards from the payment service.

Additional functional components may include an operating system 620 for controlling and managing various functions of the POS device 600 and for enabling basic user interactions with the POS device 600. The memory 604 may also store transaction data 622 that is received based on the merchant associated with the POS device 600 engaging in various transactions with customers. Additionally, the memory 604 may store contact information for customer, such as the customer 208.

In addition, the memory 604 may also store data, data structures and the like, that are used by the functional components. For example, this data may include item information that includes information about the items offered by the merchant, which may include images of the items, descriptions of the items, prices of the items, and so forth. Depending on the type of the POS device 600, the memory 604 may also optionally include other functional components and data, which may include programs, drivers, etc., and the data used or generated by the functional components. Further, the POS device 600 may include many other logical, programmatic and physical components, of which those described are merely examples that are related to the discussion herein.

The network interface(s) 610 may include one or more interfaces and hardware components for enabling communication with various other devices over the network or directly. For example, network interface(s) 610 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 6 further illustrates that the POS device 600 may include the display 606 mentioned above. Depending on the type of computing device used as the POS device 600, the display 606 may employ any suitable display technology. For example, the display 606 may be a liquid crystal display, a plasma display, a light emitting diode display, an OLED (organic light-emitting diode) display, an electronic paper display, or any other suitable type of display able to present digital content thereon. In some examples, the display 606 may have a touch sensor associated with the display 606 to provide a touchscreen display configured to receive touch inputs for enabling interaction with a graphic interface presented on the display 606. Accordingly, implementations herein are not limited to any particular display technology. Alternatively, in some examples, the POS device 600 may not include the display 606, and information may be present by other means, such as aurally.

The I/O components 608, meanwhile, may include speakers, a microphone, a camera, and various user controls (e.g., buttons, a joystick, a keyboard, a keypad, etc.), a haptic output device, and so forth. For instance, I/O components 608 can include a printing device for printing physical receipts for customers. In some examples, the POS device uses the printing device to print the physical receipts after receiving data representing the receipts from a payment service.

It should be noted that, in some examples, the I/O components 608 may be separate from the POS device 600. For instance, the printing device may be separate from the POS device 600. In some examples, the POS device 600 sends data representing the receipts to the printing device in order to cause the printing device to print physical receipts.

In addition, the POS device 600 may include or may be connectable to a payment instrument reader 612. In some examples, the reader 612 may plug in to a port in the merchant device, such as a microphone/headphone port, a data port, or other suitable port. In other instances, the reader 612 is integral with the entire POS device 600. The reader 612 may include a read head for reading a magnetic strip of a payment card, and further may include encryption technology for encrypting the information read from the magnetic strip. Alternatively, numerous other types of card readers may be employed with the POS devices 600 herein, depending on the type and configuration of a particular POS device 600.

The location component 614 may include a GPS device able to indicate location information, or the location component 614 may comprise another other location-based sensor. The POS device 600 may also include one or more additional sensors (not shown), such as an accelerometer, gyroscope, compass, proximity sensor, and the like. Additionally, the POS device 600 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method for processing payments between a merchant and customer via a payment service, the method comprising:
receiving card data from a point-of-sale (POS) device of the merchant, the card data indicating payment information of a card used during a transaction between the merchant and the customer;
sending the card data to a centralized data store, wherein the centralized data store includes historical transaction information associated with the card and a plurality of other cards, wherein the historical transaction information is sourced from the payment service and a plurality of third-party payment services;
analyzing the transaction and the card data using a risk model to compute a first risk score;
determining that the first risk score traverses a first threshold risk value;
based at least in part on determining that the first risk score traverses the first threshold risk value, querying the centralized data store to retrieve data corresponding to the historical transaction information that is associated with the card;
receiving the data corresponding to the historical transaction information from the centralized data store;
applying the data to the risk model to generate a second risk score for the transaction;
determining that the second risk score does not traverse at least one of the first threshold risk value or a second threshold risk value;
based at least in part on determining that the second risk score does not traverse at least one of the first threshold risk value or the second threshold risk value, authorizing the card for the transaction based at least in part on the second risk score; and
sending, to the POS device, a message including an indication that the card is authorized for the transaction, the message configured to cause the POS device to authorize use of the card for the transaction.

2. The method as recited in claim 1, further comprising:
determining a type of data associated with the card to query from the centralized data store,
wherein the query indicates the type of data.

3. The method as recited in claim 1, wherein the historical transaction information comprises first historical transaction data, and wherein the method further comprises:
storing second historical transaction information, the second historical transaction information being associated with transactions between merchants and customers that were previously authorized by the payment service,
wherein analyzing the transaction and the card data using the risk model comprises analyzing the transaction and the card data using the risk model and at least a portion of the second historical information to determine the first risk score.

4. The method as recited in claim 1, further comprising:
determining a final risk score based at least in part on the first risk score and the second risk score; and
determining that the final risk score does not traverse at least one of the first threshold risk value, the second threshold risk value, or an additional threshold risk value,
and wherein authorizing the card for the transaction is based at least in part on determining that the final risk score does not traverse the at least one of the first threshold risk value, the second threshold risk value, or the additional threshold risk value.

5. A method comprising:
receiving first data from a merchant device, the first data indicating at least payment information associated with a payment instrument used during a transaction between a merchant and a customer;
determining a first risk score based at least in part on analyzing the first data;
sending a first message to one or more computing devices, the first message including at least the payment information and a query for second data associated with the payment instrument;
receiving, from the one or more computing devices, the second data associated with the payment instrument;
determining, by a model and based, at least in part, on the first data and the second data, a second risk score associated with the payment instrument;
determining that the second risk score is below a threshold risk score;
determining, based at least on the second risk score being below the threshold risk score, that the payment instrument is authorized for the transaction; and
sending, to the merchant device, a second message indicating that the payment instrument is authorized.

6. The method as recited in claim 5, wherein the second data comprises at least one of:
historical transaction data associated with the payment instrument that the one or more computing devices receive from a plurality of payment services; or
information associated with a type of data from the historical transaction data.

7. The method as recited in claim 5, further comprising:
storing third data associated with at least a previous transaction, the third data indicating one or more of the payment information, a cost of the previous transaction, a time of the previous transaction, and a geographic location of the previous transaction;
determining, by a model and based, at least in part, on the first data and the third data, a third risk score;
determining that the third risk score traverses the threshold risk score,
and wherein sending the first message to the one or more computing devices is based at least in part on determining that the third risk score traverses the threshold risk score.

8. The method as recited in claim 5, wherein the threshold risk score comprises a first threshold risk score, and wherein the method further comprises:
determining that the second risk score does not traverse at least one of the first threshold risk score or a second threshold risk score,
and wherein determining that the payment instrument is authorized is based at least in part on determining that the second risk score does not traverse at least one of the first threshold risk score or the second threshold risk score.

9. The method as recited in claim 5, wherein the threshold risk score comprises a first threshold risk score, and wherein the method further comprises:
determining a third risk score based at least in part on the first risk score and the second risk score; and
determining that the third risk score does not traverse at least one of the first threshold risk score or a second threshold risk score,
wherein determining that the payment instrument is authorized is based at least in part on determining that the third risk score does not traverse the at least one of the first threshold risk score or the second threshold risk score.

10. The method as recited in claim 5, further comprising:
determining, based at least in part on at least one of the query or the model, a type of data to request from the one or more computing devices,
and wherein the query indicates the type of data associated with the payment instrument, the second data representing the type of data.

11. The method as recited in claim 5, wherein:
the second data comprises a first type of data and a second type of data;
the model comprises a first model;
analyzing the first data comprises analyzing the first data using the first type of data and the first model;
determining, by the first model and based, at least in part, on the first type of data, that the payment instrument is authorized for a cost of the transaction; and
at least partly before determining that the payment instrument is authorized, the method further comprises:
determining, by a second model and based, at least in part, on the second type of data, that the payment instrument is not authorized for the cost of the transaction.

12. The method as recited in claim 5, further comprising sending the payment information to the one or more computing devices, wherein the one or more computer devices store historical transaction data from a plurality of payment services.

13. The method as recited in claim 5, wherein the second data includes at least one of:
information indicating one or more costs of one or more transactions in which the payment instrument was authorized;
information indicating one or more geographical locations of the one or more transactions in which the payment instrument was authorized; and
information indicating a frequency in which the payment instrument is used during transactions.

14. A method comprising:
receiving, from a plurality of payment services, first data associated with a plurality of transactions, the first data for a transaction of the plurality of transactions indicating at least one of respective payment information associated with a respective payment instrument, a cost of the transaction, a time of the transaction, and a geographic location of the transaction;
storing the first data in one or more databases;
receiving a message from a payment service of the plurality of payment services, the message including at least payment information associated with a payment instrument and a query for information associated with the payment instrument;

generating second data including a representation of the information associated with the payment instrument based, at least in part, on identifying a portion of the first data using the query;

sending the second data to the payment service;

receiving, from the payment service, third data associated with an additional transaction between a merchant and a customer, the third data indicating at least the payment information associated with the payment instrument;

determining, by a model and based, at least in part, on the third data and the second data, that the payment instrument is authorized for the additional transaction; and sending, to the payment service, a message indicating that the payment instrument is authorized for the additional transaction.

15. The method as recited in claim 14, wherein the information includes at least one of:

costs of one or more transactions in which the payment instrument was authorized;

geographical locations of the one or more transactions in which the payment instrument was authorized; and a frequency in which the payment instrument is used during transactions.

16. The method as recited in claim 14, wherein:

the third data includes at least one of an indication of the payment information, a cost of the additional transaction, a geographical location of the additional transaction, and a time of the additional transaction; and the method further comprises storing the third data in the one or more databases.

17. The method as recited in claim 14, wherein the message comprises a first message, the payment service comprises a first payment service, the query comprises a first query, and the information comprises a first type of information, and wherein the method further comprises:

receiving a second message from a second payment service of the plurality of payment services, the second message including the payment information associated with the payment instrument and a second query for a second type of information associated with the payment instrument, wherein the first type of information is different than the second type of information;

generating fourth data including a representation of the second type of information associated with the payment instrument based, at least in part, on identifying a portion of the first data using the second query; and sending the fourth data to the second payment service.

18. The method as recited in claim 5, wherein the first data from the merchant device is received at one or more computing device associated with a payment service and the second data is based, at least in part, on transaction data received at the one or more computing devices from at least one of the merchant device or a second merchant device.

19. The method as recited in claim 14, wherein operations of the method are accomplished by a central service that includes a computing device that is communicatively connected by a first network connection to a point-of-sale (POS) device associated with the merchant, the POS device being connected by a second network connection to the payment service.

* * * * *